UNITED STATES PATENT OFFICE.

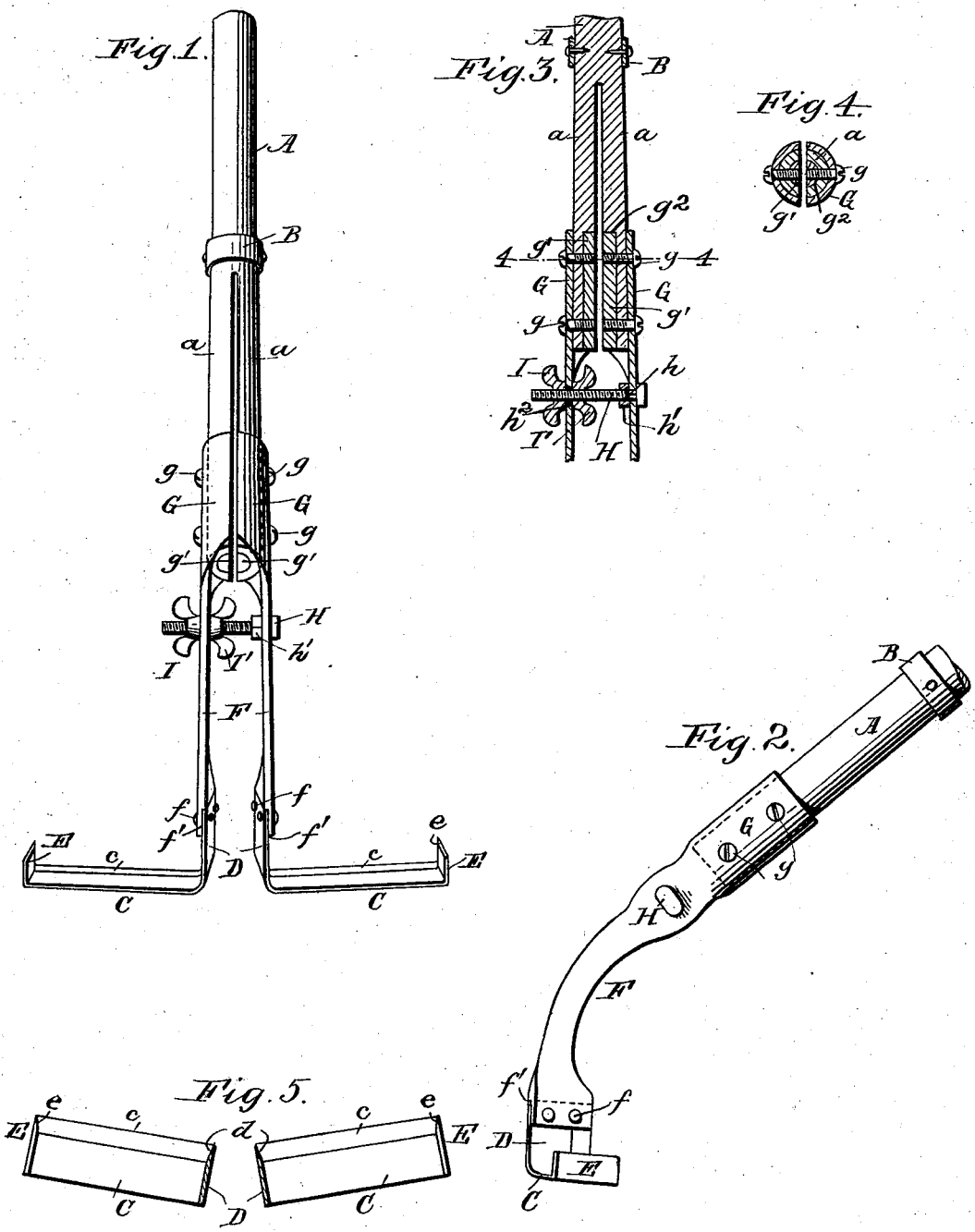

EDWIN C. LEWIS, OF DETROIT, MICHIGAN.

HOE.

SPECIFICATION forming part of Letters Patent No. 702,659, dated June 17, 1902.

Application filed December 23, 1901. Serial No. 86,884. (No model.)

*To all whom it may concern:*

Be it known that I, EDWIN C. LEWIS, a subject of the King of Great Britain, residing at Detroit, in the county of Wayne and State of Michigan, have invented new and useful Improvements in Hoes, of which the following is a specification.

This invention relates to a blocking-out and weeding hoe of the kind which is provided with two blades arranged side by side at a suitable distance apart to straddle the plants under cultivation and in which the blades are attached to the handle by shanks which connect with the inner ends of the blades. This kind of hoe is especially adapted for use in the cultivation of beets and other roots and small plants which are planted in hills or rows.

The objects of the invention are to provide a simple, durable, and convenient hoe of this character which is adapted to cultivate the beets or other roots or plants close to the same and so as to remove weeds and thin out surplus roots or plants without injury to the root or plant and without danger of pulling down the hill, to provide a simple and strong connection between the blades and the handle, and to so construct the connection between the blades and the handle that the blades can be readily adjusted to space the same at different distances in order to adapt the hoe for use with roots or plants of different sizes and for blocking out hills at different distances apart.

In the accompanying drawings, Figure 1 is a perspective view of a hoe embodying the invention, the upper portion of the handle being broken away. Fig. 2 is a side elevation thereof. Fig. 3 is a fragmentary longitudinal section through the handle and attaching and adjusting devices for the blades. Fig. 4 is a transverse sectional view through the blade-attaching means on the line 4 4, Fig. 3. Fig. 5 is a plan view, partly in section, showing the relative arrangement of the blades.

Like letters of reference refer to like parts in the several figures.

A represents the hoe-handle, which, as usual, is preferably made of wood and approximately cylindrical. The lower end of the handle is divided longitudinally to provide two separated yielding arms or forked securing portions $a$ for the hoe-blades.

B represents a ring or ferrule secured to the handle above the divided lower portion thereof to prevent the splitting of the handle in the use of the hoe.

C C represent the two hoe-blades, which are preferably, as shown in the drawings, elongated, narrow, and provided at the front with beveled or cutting edges $c$. The inner ends of the blades are bent up to provide upwardly-projecting substantially vertical blade extensions D, which like the horizontal portions or blades proper are provided at the front with beveled or cutting edges $d$. The two upright blade extensions D converge forwardly, as clearly shown in Figs. 1 and 5, so that their front or cutting edges are closer together than their rear edges or backs. Preferably the outer ends of the hoe-blades are bent up to provide substantially vertical blade extensions E, which also have beveled front or cutting edges $e$.

The hoe-blades are provided with upwardly and forwardly extending attaching-shanks F, which rise from the inner vertical blade extensions. These shanks constitute upward prolongations of the inner upright blade extensions D and are preferably formed separately from the blades and secured at their lower ends to the upper ends of these blade extensions by rivets $f$ or other suitable means. The shanks are shown as provided on the inner sides of their lower ends with seats or depressions $f'$, in which the blade extensions D are arranged to secure a more rigid attachment of the blades. This construction enables the blades when worn or broken to be removed from the shanks and replaced by new blades, but, if desired, the shanks may be formed integrally with the blades.

Each shank is provided at its upper end with a semicylindrical socket-plate or half-socket G, which surrounds or embraces the outer semicylindrical face of one of the handle-arms $a$. These socket-plates are secured to the handle-arms by screws $g$, which pass inwardly through holes formed in the socket-plates and in the handle-arms and are screwed into plates $g'$, arranged on the inner sides of the handle-arms. As shown, each of these plates is provided with two screw-threaded holes which receive the inner ends of the two screws by which each socket-plate is secured to its handle-arm. These screw-plates are preferably half-round on their outer sides and flat on their inner sides, as shown in Figs. 1 and 4, and are seated in half-round recesses or grooves $g^2$, formed lengthwise in the inner sides of the handle-arms. These half-round screw-plates or nuts are preferred, as the seats or grooves therefor can be readily formed simultaneously in both handle-arms by boring. The half-round socket-plates which surround the outer faces of the handle-arms brace or strengthen the latter and enable the implement to withstand considerable rough usage.

Suitable means are provided for setting or adjusting the blades nearer to or farther from each other to adapt the hoe for use with plants or roots of different sizes or which are differently spaced. The means shown in the drawings for this purpose consists of a transverse screw-bolt H, which connects the shanks F below the handle-arms. This bolt is preferably held in one of the shanks against turning by an angular or square neck $h$, Fig. 3, and is secured to this shank by its head and a nut $h'$, screwed on the bolt against the inner face of the shank. The bolt extends through an elongated or enlarged hole $h^2$ in the other shank and is adjustably secured to the same by two thumb-nuts I I', screwed on the bolt on opposite sides of the shank. By means of these thumb-nuts the blades can be quickly and easily forced toward or from each other and secured in any desirable position, the yielding handle-arms permitting such movement of the shanks and blades without distorting the same or weakening their connection with the handle.

In the use of the hoe the handle is held at such an inclination that the horizontal portions of the blades stand at a very slight downward inclination, so that in pulling the hoe by the handle the blades cut into the surface of the soil and sever the roots of any weeds or surplus plants. The converging portions D enable the user to cut or cultivate the soil close to the plant or root without danger of hurting the latter, and as these upright portions of the blades converge toward the front, so that the space between the same widens rearwardly, they leave the hill intact and do not have a tendency to pull the same down, because as the hoe is moved forwardly the earth frees itself from the blades and does not cling to the latter in such a way that it is pulled by the blades away from the plant or root. At the same time the outer rearwardly-diverging faces of the inner upright blade portions push the separated roots or weeds out of their seed-beds, so as to effectually destroy the same. The blades are secured to the attaching-shanks in such relation that the upright extensions at the inner ends of the blades always stand at an inclination to each other or converge forwardly, whether or not the shanks are adjusted toward or from each other to the limit of their movement. The advantages stated of having the extensions converge are therefore never defeated. By the adjusting means above described the blades can be set to suit different sizes of plants or hills and also to lengthen or shorten the combined width of the two hoe-blades, so that a less or greater distance can be cultivated between adjacent hills in order to space the hills nearer to or farther apart in blocking out. The yielding arms or securing portions of the handle permit of a considerable range of adjustment of the blades without straining the shanks or their connection with the handle.

I claim as my invention—

1. The combination of a handle having a longitudinally-divided lower end, forming two yielding securing-arms, two hoe-blades arranged side by side, rigid attaching-shanks rising from the inner sides of said blades and secured to said arms, and an adjusting device connecting said shanks below said yielding securing-arms for holding said yielding securing-arms spaced apart more or less, substantially as set forth.

2. The combination of a handle having a longitudinally-divided lower end, forming two yielding securing-arms, two hoe-blades arranged side by side, rigid attaching-shanks rising from the inner ends of said blades and provided at their upper ends with half-sockets, means for securing said half-sockets to said arms, and a transverse adjusting-screw connecting said shanks below said arms for holding said yielding securing-arms spread apart more or less, substantially as set forth.

3. The combination of a handle having a longitudinally-divided lower end, forming two yielding securing-arms, two hoe-blades arranged side by side, attaching-shanks rising from the inner ends of the hoe-blades and provided at their upper ends with socket-plates which are arranged against the outer sides of said arms, screw-plates arranged against the inner sides of said arms, and fastening-screws inserted through said socket-plates and arms into said screw-plates, substantially as set forth.

4. The combination of a handle having a longitudinally-divided lower end, forming two yielding securing-arms which are provided on their inner sides with longitudinal grooves, two hoe-blades arranged side by side, attaching-shanks rising from the inner ends of the hoe-blades and provided at their upper ends with socket-plates which are arranged against the outer sides of said arms, screw-plates arranged in the grooves on the inner sides of said arms, and fastening-screws inserted through said socket-plates and arms into said screw-plates, substantially as set forth.

5. The combination of a handle, attaching-shanks secured to said handle and adjustable toward and from each other, and two substantially horizontal hoe-blades secured to said shanks side by side and provided at their inner ends with upright blade extensions the inner or opposing faces of which converge forwardly in all positions of the shanks, substantially as set forth.

6. The combination of a handle having a longitudinally-divided lower end, forming two yielding securing-arms, two substantially horizontal hoe-blades arranged side by side and provided at their inner ends with upright blade extensions the inner or opposing faces of which converge forwardly, attaching-shanks rising from said blade extensions and secured to said arms, and an adjusting device connecting said shanks below said arms, substantially as set forth.

Witness my hand this 18th day of December, 1901.

EDWIN C. LEWIS.

Witnesses:
JOSEPH W. HUMPHRY,
GEORGE GORDON CHRISTIE.